United States Patent
Jackson

(10) Patent No.: US 7,182,297 B2
(45) Date of Patent: Feb. 27, 2007

(54) METHOD AND APPARATUS FOR SUPPORTING AIRCRAFT COMPONENTS, INCLUDING ACTUATORS

(75) Inventor: Clifford Jackson, White Salmon, WA (US)

(73) Assignee: The Insitu Group, Inc., Bingen, WA (US)

( * ) Notice: Subject to any disclaimer, the term of this patent is extended or adjusted under 35 U.S.C. 154(b) by 302 days.

(21) Appl. No.: 10/758,294

(22) Filed: Jan. 15, 2004

(65) Prior Publication Data

US 2005/0178885 A1 Aug. 18, 2005

Related U.S. Application Data

(60) Provisional application No. 60/440,848, filed on Jan. 17, 2003.

(51) Int. Cl.
*B64C 13/28* (2006.01)
(52) U.S. Cl. ...................................... 244/231
(58) Field of Classification Search ................ 244/231, 244/232, 233, 76 A
See application file for complete search history.

(56) References Cited

U.S. PATENT DOCUMENTS

| | | | |
|---|---|---|---|
| 2,315,110 A | * | 3/1943 | Dornier ......................... 74/625 |
| 2,911,509 A | * | 11/1959 | Millerwise ................... 200/332 |
| 3,713,162 A | | 1/1973 | Munson et al. |
| 5,774,932 A | * | 7/1998 | Mallory et al. ................. 15/350 |
| 5,913,492 A | * | 6/1999 | Durandeau et al. ............ 244/82 |
| 6,056,237 A | | 5/2000 | Woodland |
| 6,056,327 A | | 5/2000 | Bouldin et al. |
| 6,142,413 A | * | 11/2000 | Dequin et al. ............ 244/17.13 |
| 6,653,980 B2 | | 11/2003 | Ceccom et al. |

FOREIGN PATENT DOCUMENTS

WO WO-04-066433 A2 8/2004

OTHER PUBLICATIONS

U.S. Appl. No. 10/758,293, Knapp.

* cited by examiner

*Primary Examiner*—Tien Dinh
(74) *Attorney, Agent, or Firm*—Perkins Coie LLP

(57) ABSTRACT

Methods and apparatuses for supporting aircraft components, including actuators are disclosed. An apparatus in accordance with one embodiment of the invention includes an actuator housing having an actuator receptacle that securely yet releasably receives an actuator. The actuator receptacle can include conformal walls that conform at least in part to the shape of the actuator and can accordingly squeeze the actuator and properly align the actuator. At least one of the actuator walls can further include a projection that is releasably received in a corresponding recess of the actuator. One of both of these features can releasably secure the actuator relative to the aircraft, reducing and/or eliminating the likelihood that the actuator will be misaligned and/or mispositioned relative to the aircraft during installation and/or replacement.

7 Claims, 5 Drawing Sheets

METHOD AND APPARATUS FOR SUPPORTING AIRCRAFT COMPONENTS, INCLUDING ACTUATORS

CROSS-REFERENCE TO RELATED APPLICATION(S)

This application claims priority to U.S. Provisional Application 60/440,848 filed Jan. 17, 2003, which is herein incorporated in its entirety.

TECHNICAL FIELD

The present invention relates generally to methods and apparatuses for supporting actuators and other components in aircraft, including unmanned aircraft.

BACKGROUND

Unmanned aircraft or air vehicles (UAVs) provide enhanced and economical access to areas where manned flight operations are unacceptably costly and/or dangerous. For example, unmanned aircraft outfitted with remotely controlled cameras can perform a wide variety of surveillance missions, including spotting schools of fish for the fisheries industry, monitoring weather conditions, providing border patrols for national governments, and providing military surveillance before, during, and/or after military operations.

Actuators are typically used in aircraft, including unmanned aircraft, to move components of the aircraft before, during, and after flight. During the life of the aircraft, these actuators are typically replaced at periodic intervals and/or after a failure. One drawback with existing arrangements for supporting the actuators in the aircraft is that it may be difficult and/or time consuming for an operator to easily and accurately position the replacement actuator in exactly the same location as the original actuator. If the replacement actuator is not properly positioned, it may not properly drive the component to which it is coupled. For example, if a replacement actuator is improperly aligned and coupled to a flight control surface, such as an aileron, it may not provide the control capability desired and/or required for operation of the aircraft. This can lead to unacceptably poor performance of the aircraft and/or a loss of the aircraft.

DETAILED DESCRIPTION

The present disclosure describes methods and apparatuses for supporting actuators for aircraft, such as unmanned aircraft. Many specific details of certain embodiments of the invention are set forth in the following description and in FIGS. 1–6 to provide a thorough understanding of these embodiments. One skilled in the art, however, will understand that the present invention may have additional embodiments, and that the invention may be practiced without several of the details described below.

Figure 1:
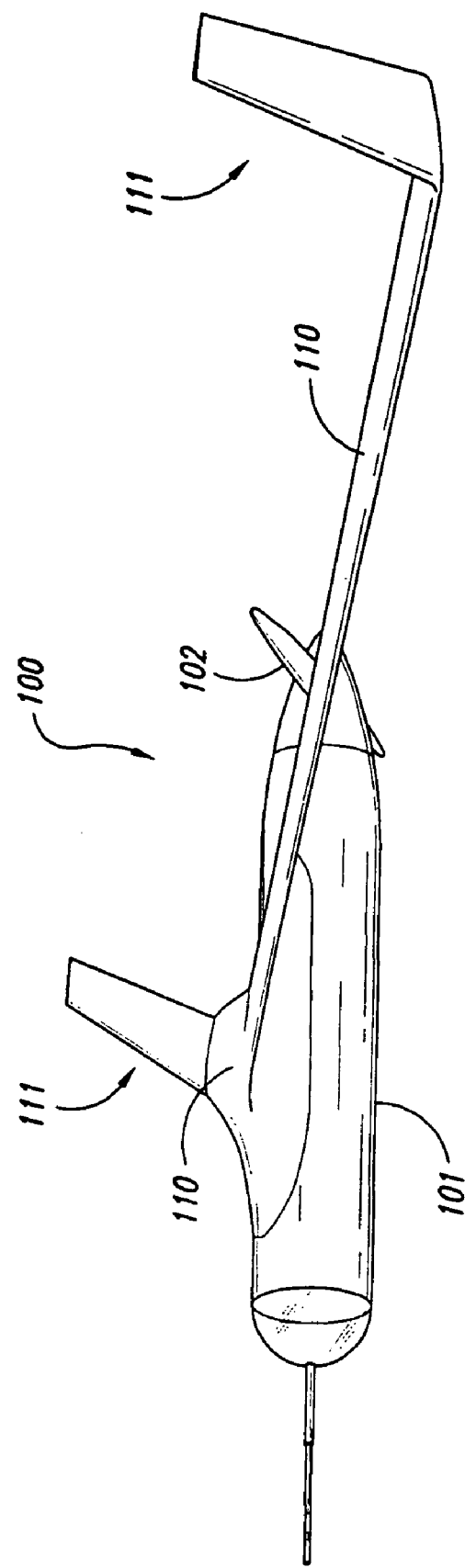
FIG. 1 is a partially schematic, top isometric view of an aircraft configured to include actuators supported in accordance with an embodiment of the invention.

FIG. 1 is a partially schematic, isometric illustration of an unmanned aircraft 100 configured to support actuators in accordance with an embodiment of the invention. In one aspect of this embodiment, the unmanned aircraft 100 can include a fuselage 101, a pair of wings 110 extending outwardly from the fuselage 101, and a propellor 102 positioned at the aft end of the fuselage 101 to propel the aircraft 100 during flight. Each wing 110 can include an upwardly extending winglet 111 for lateral stability and control. Aspects of methods and apparatuses for supporting devices, including actuators that move components of the aircraft 100 are described in greater detail below with reference to FIGS. 2–6.

Figure 2:
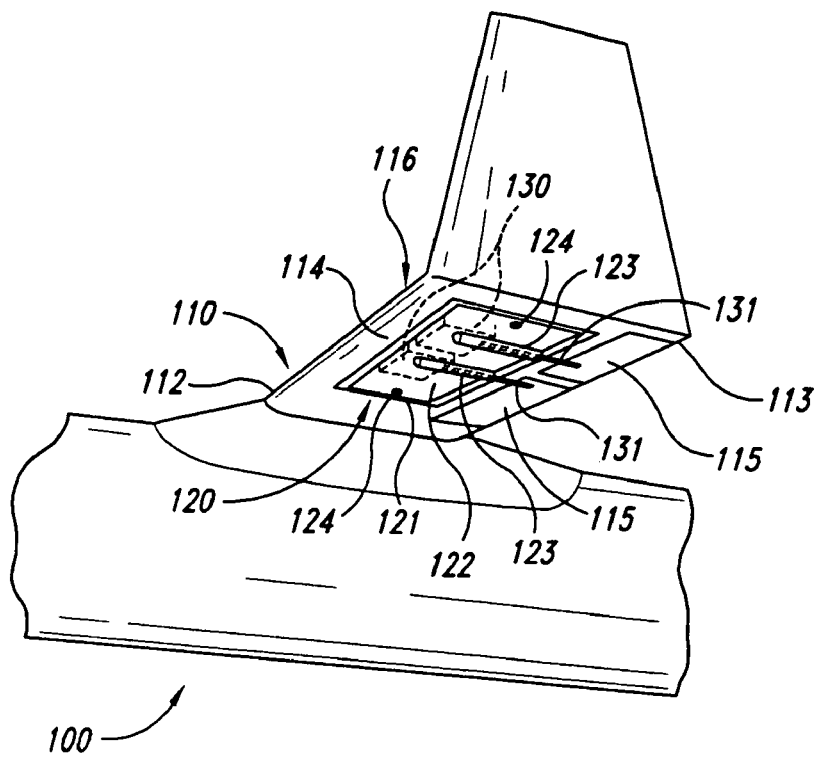
FIG. 2 is a bottom isometric view of a portion of the aircraft shown in FIG. 1 having an actuator housing in accordance with an embodiment to the invention.

FIG. 2 is a partially schematic, bottom isometric illustration of a portion of the aircraft 100 described above with reference to FIG. 1. In one aspect of an embodiment of the invention shown in FIG. 2, the wing 110 of the aircraft 101 can include an upper surface 116, a lower surface 114, a leading edge 112, and a trailing edge 113 aft of the leading edge 112. The trailing edge 113 can include trailing edge devices 115 that are movable relative to the wing 110 to control and stabilize the aircraft 100. The trailing edge devices 115 can be coupled to actuators 130 with actuator linkages 131. The actuators 130 can be commanded remotely to move the trailing edge devices 115 during flight.

In one aspect of an embodiment shown in FIG. 2, the actuators 130 can be snugly but removably positioned in an actuator housing 120. The actuator housing 120 can include an actuator support 121 positioned proximate to the lower surface 114 of the wing 110. The actuator housing 120 can further include a cover 122 removably attached to the actuator support 121 (and/or directly to the wing 110) with attachment devices, such as attachment screws 124. The cover 122 can include fairings 123 positioned to provide an aerodynamically contoured shield for the actuator linkages 131, while allowing the actuator linkages 131 to move relative to the wing 110.

Figure 3:
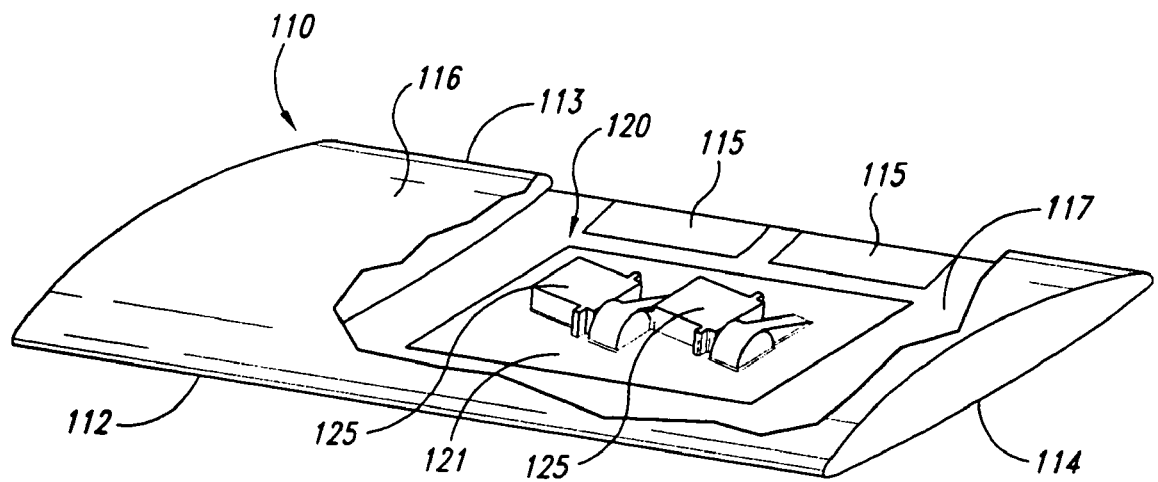
FIG. 3 is a partially cutaway, top isometric view of a portion of an aircraft wing having an actuator housing in accordance with an embodiment of the invention.

FIG. 3 is a partially broken, top isometric view of a portion of the wing 110, illustrating aspects of the actuator housing 120 in accordance with an embodiment of the invention. In one aspect of this embodiment, the actuator support 121 can include one or more actuator receptacles 125 (two are shown in FIG. 3) having a downwardly facing opening (not visible in FIG. 3) configured to accommodate a corresponding one of the actuators 130 (FIG. 2). The actuator support 121 can be securely fastened to a lower internal surface 117 of the wing 110. For example, in one embodiment, the actuator support 121 can be adhesively bonded to the lower internal surface 117. In another embodiment, the actuator support 121 can be formed integrally with the lower internal surface 117. In any of these embodiments, the actuator receptacle 125 can include an upwardly extending cavity having walls that closely conform to the shape of the corresponding actuator 130. Accordingly, the likelihood for misaligning the actuator 130 relative to the components it actuates (e.g., the trailing edge devices 115) can be significantly reduced when compared with existing arrangements.

Figure 4:
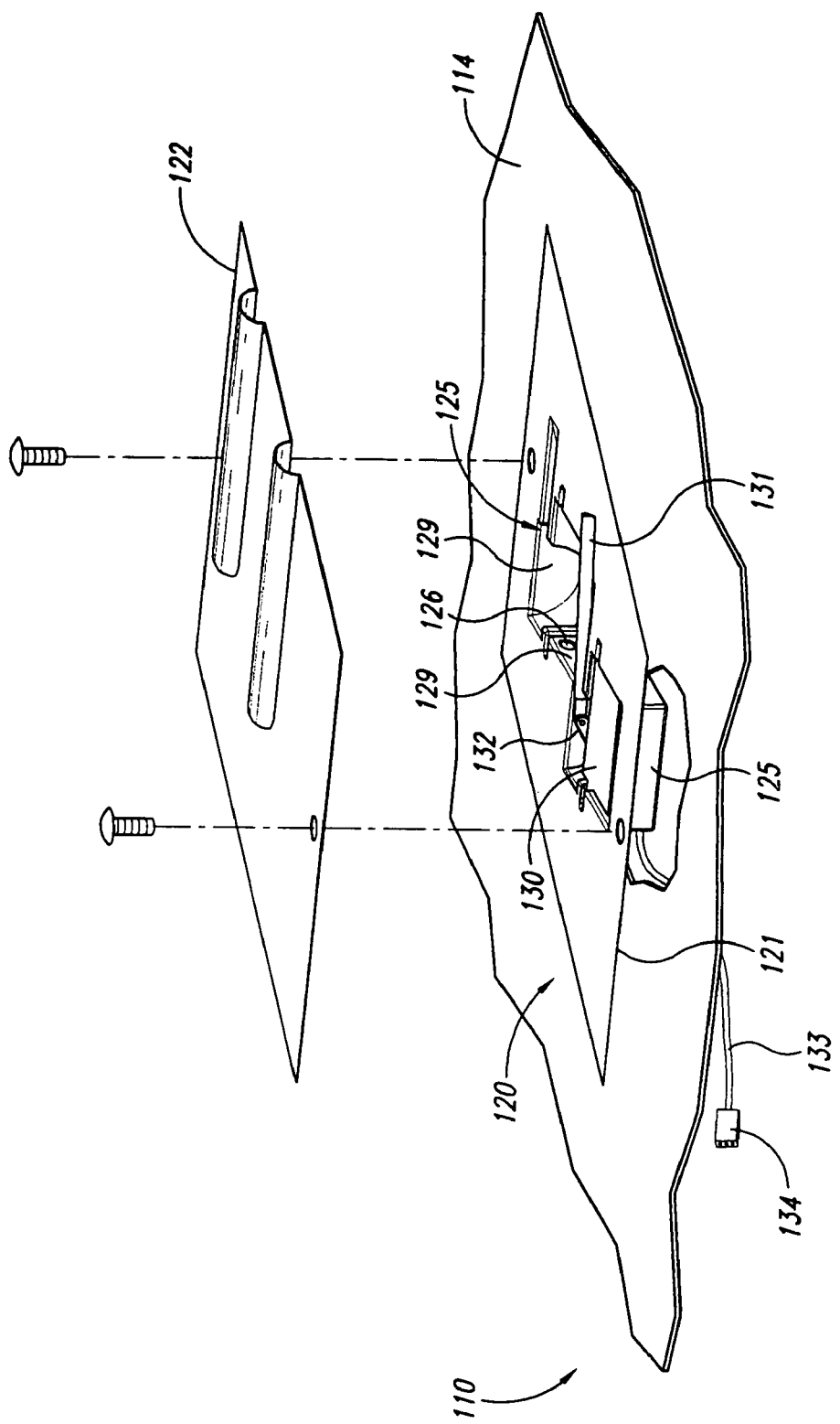
FIG. 4 is a partially exploded, inverted isometric view of the lower surface of an aircraft wing having an actuator housing supporting an actuator in accordance with an embodiment to the invention.

FIG. 4 is a partially schematic, partially exploded isometric view of a portion of the lower surface 114 of the wing 110, which is inverted for purposes of illustration. Also for purposes of illustration, one of the actuator receptacles 125 is shown being occupied by an actuator 130, and the other actuator receptacle 125 is shown empty. In one aspect of an embodiment shown in FIG. 4, the actuator support 121 of the actuator housing 120 can be securely positioned relative to the lower surface 114 of the wing 110, as described above. The actuator receptacles 125 of the actuator support 121 can include receptacle walls 129 that conform closely to the surfaces of the actuator 130. For example, in one aspect of this embodiment, the actuator support 121 can include a flexible, conformal material, such as a thermoplastic or thermoset material, and the actuator receptacles 125 can be slightly undersized in comparison to the actuators 130. Accordingly, when the actuators 130 are positioned within the actuator receptacles 125, the receptacle walls 129 can exert a squeezing force on the actuators 130, further reducing the likelihood that the actuators 130 will be mispositioned or misaligned when installed in the actuator receptacles 125. Additional aspects of the actuator receptacles 125 that can further secure the actuators 130 relative to the wing 120 are descried below with reference to FIGS. 5A–5B.

In one aspect of an embodiment shown in FIG. 4, at least one of the receptacle walls 129 can include a cable opening 126 positioned to receive a cable 133 and a connector 134 of the actuator 130. Accordingly, the cable 133 can be threaded through the receptacle wall 129 for connecting to other aircraft components, such as power sources and/or command signal sources. The cable 133 and the connector 134 can accordingly provide control signals and power to the actuator 130. The actuator 130 can include an actuator arm 132 coupled to an actuator linkage 131 that is in turn coupled to a component of the aircraft, such as the trailing edge devices 115 described above with reference to FIGS. 1–3.

Figure 5A:
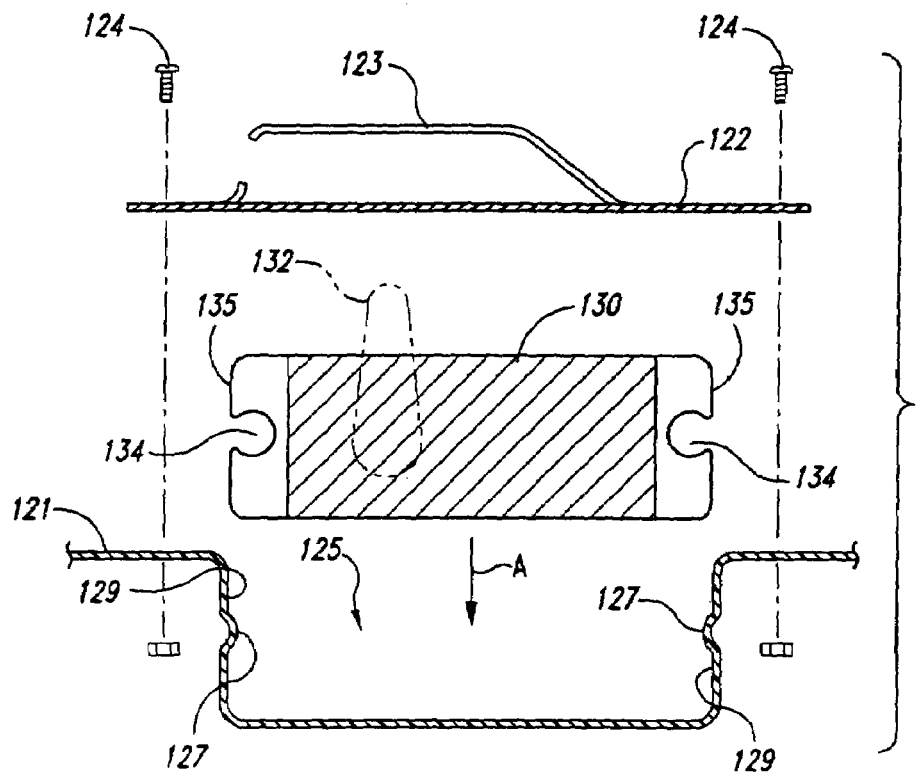
FIG. 5A–5B are partially schematic, cross-sectional side views of an assembly process for supporting an actuator in accordance with an embodiment of the invention.

FIG. 5A is a partially schematic, partially exploded cross-sectional illustration of a method for releasably installing an actuator 130 in accordance with an embodiment of the invention. In one aspect of this embodiment, the actuator 130 can include one or more recesses 134 or other registration features that extend inwardly from an outer surface 135 of the actuator 130. The receptacle walls 129 of the actuator receptacle 125 into which the actuator 130 is placed can include corresponding projections 127 or other registration features positioned to be received in the recesses 134 when the actuator 130 is moved into the actuator receptacle 125, as indicated by arrow "A". In one aspect of this embodiment, the projections 127 can be formed integrally with the receptacle walls 129 and can "snap" into the recesses 134 as the actuator 130 is moved into the actuator receptacle 125. As described above, the receptacle walls 129 can also have a resilient, conformal configuration that can squeeze the actuator 130. These two features alone and/or in combination can reduce the likelihood that the actuator 130 will be misaligned or mispositioned within the actuator receptacle 125.

Once the actuator 130 has been positioned in the actuator receptacle 125, the cover 122 can be installed on the actuator support 121, for example, with the attachment screws 124.

Figure 5B:
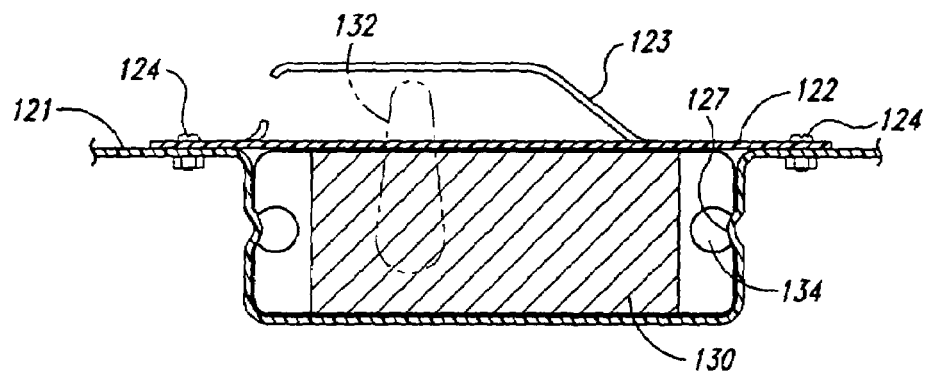

The cover 122 can be sized such that the fairing 123 is positioned over the actuator arm 132 when the cover is secured in position. The cover 122 can also bear against the actuator 130, which can increase the security with which the actuator 130 is contained in the receptacle 125. FIG. 5B is a partially schematic, cross-sectional side view of the completed installation.

In other embodiments, the conformal fit and/or the snap fit arrangements described above can be used to securely house other aircraft components. For example, referring now to FIG. 6, a component housing 620 configured in accordance with another embodiment of the invention can include a receptacle portion 621 hingedly connected to a cover portion 622. The receptacle portion 621 can include a plurality of receptacles 625, including an antenna receptacle 625a, a receiver receptacle 625b, and a transmitter receptacle 625c. In one aspect of this embodiment, the antenna receptacle 625a can be configured to releasably carry an antenna assembly 642. The receiver receptacle 625b can be configured to releasably carry a receiver module 640, and the transmitter receptacle 625c can be configured to releasably carry a transmitter module 641. The receiver module 640 and the transmitter module 641 can be electrically coupled to the antenna assembly 642 with leads 643. In one aspect of this embodiment, any of the receptacles 625 can be formed from a resilient material having a shape that conforms at least in part to the shape of the component it receives. The receptacles 625 can also include projections or other features that can releasably interlock with corresponding features of the components they carry. Accordingly, the receptacles 625 can include a snap fit arrangement, generally similar to that described above with reference to FIGS. 5A–5B. As was also described above, an advantage of this arrangement is that the components can be placed in the component housing 620 in a consistent, repeatable manner.

Figure 6:
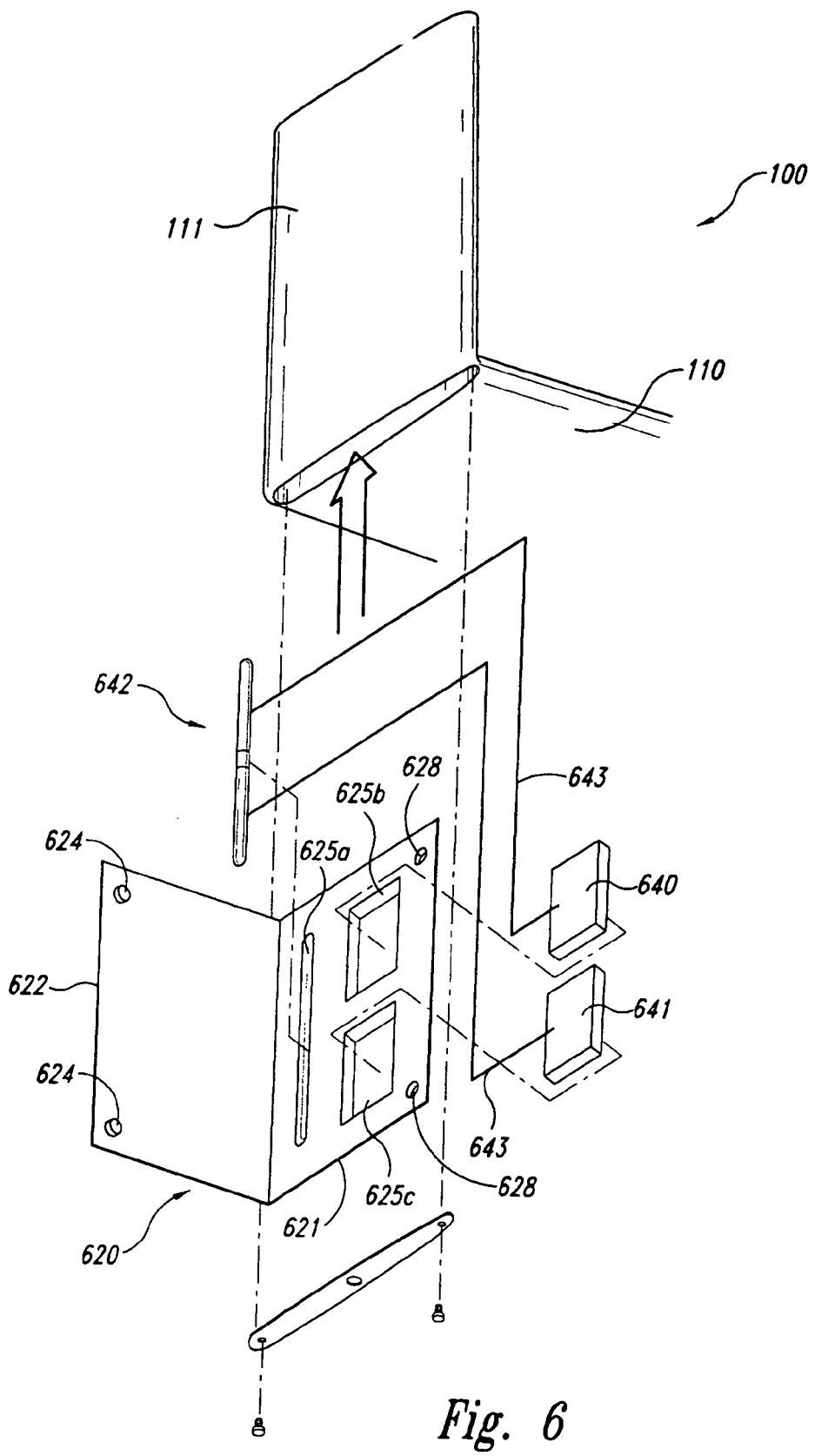
FIG. 6 is a partially schematic, exploded isometric view of a component housing configured in accordance with another embodiment of the invention.

In a further aspect of an embodiment of the component housing 620 shown in FIG. 6, the cover portion 622 can include locking tabs 624 that are releasably received in corresponding lock receptacles 628 positioned in the receptacle portion 621. After the components (e.g., the antenna assembly 642, the receiver module 640, and the transmitter module 641) are placed in the corresponding receptacles 625a-c, the cover portion 622 can be locked down over the receptacle portion 621 by engaging the locking tabs 624 in the lock receptacles 628, further securing the components contained in the component housing 620. In still a further aspect of this embodiment, the entire component housing 620 can then be removably positioned in the aircraft 100. For example, in one aspect of this embodiment, the component housing 620 can be removably positioned in the winglet 111. Further aspects of antenna assemblies and corresponding receiver modules and transmitter modules are included in U.S. application Ser. No. 10/758293, entitled "Conductive Structures Including Aircraft Antennae and Associated Methods of Formation," filed concurrently herewith and incorporated herein in its entirety by reference.

From the foregoing, it will be appreciated that specific embodiments of the invention have been described herein for purposes of illustration, but that various modifications may be made without deviating from the spirit and scope of the invention. For example, in other embodiments, the arrangements described above can be used with aircraft having configurations different than those described above, and/or can support components different than those described above. Accordingly, the invention is not limited except as by the appended claims.

I claim:

1. An unmanned aircraft, comprising:
   a fuselage;
   a wing depending from the fuselage;
   a flight control surface that is movable relative to the wing;
   an actuator housing having a receptacle portion integrally coupled to the wing, the receptacle portion including at least one receptacle having at least one receptacle surface formed from a resilient, conformal material, the at least one receptacle surface having a projection;
   an actuator releasably disposed in the receptacle, the actuator having at least one recess into which the projection is releasably received, the actuator being under a compressive force exerted by the at least one receptacle wall; and
   an actuator linkage coupled between the actuator and the flight control surface.

2. The aircraft of claim 1 wherein the actuator includes an electric actuator and wherein the receptacle portion includes a first opening through which the actuator linkage passes, and a second opening through which an electrical cable of the actuator passes.

3. An unmanned aircraft, comprising:
   a fuselage;
   a wing depending from the fuselage;
   a device that is movable relative to at least one of the fuselage and the wing;
   actuator housing means for releasably carrying an actuator, the actuator housing means having a receptacle portion with a first registration feature;
   an actuator releasably disposed in the receptacle, the actuator being positioned adjacent to the receptacle wall and having a second registration feature engaged with the first registration feature;
   cover means removably coupled to the actuator housing means, the cover means including an opening; and
   an actuator linkage coupled between the actuator and the device, the actuator linkage extending through the opening.

4. The aircraft of claim 3 wherein the opening is a first opening, and
   wherein the actuator housing includes a second opening through which an electrical cable of the actuator passes.

5. The aircraft of claim 3 wherein the wing includes a lower surface and an upper surface facing opposite from the lower surface, and wherein the actuator housing means are integrally attached to the lower surface, the actuator being accessible through a downwardly facing aperture in the receptacle portion, further wherein the device includes a trailing edge device, still further wherein the actuator linkage is coupled between the actuator and the trailing edge device.

6. The aircraft of claim 3 wherein the receptacle surface includes a resilient, flexible, conformal surface, and wherein the first registration feature includes a protrusion extending from the receptacle surface, further wherein the second registration feature includes a recess in a surface of the actuator, the protrusion of the receptacle surface being positioned to be received in the recess of the actuator.

7. The aircraft of claim 3 wherein the receptacle surface is one of at least two opposing receptacle surfaces, each receptacle surface being resilient, flexible and conformal to force the actuator to a predetermined position relative to at least one of the wing and the fuselage.

* * * * *